Patented Aug. 7, 1945

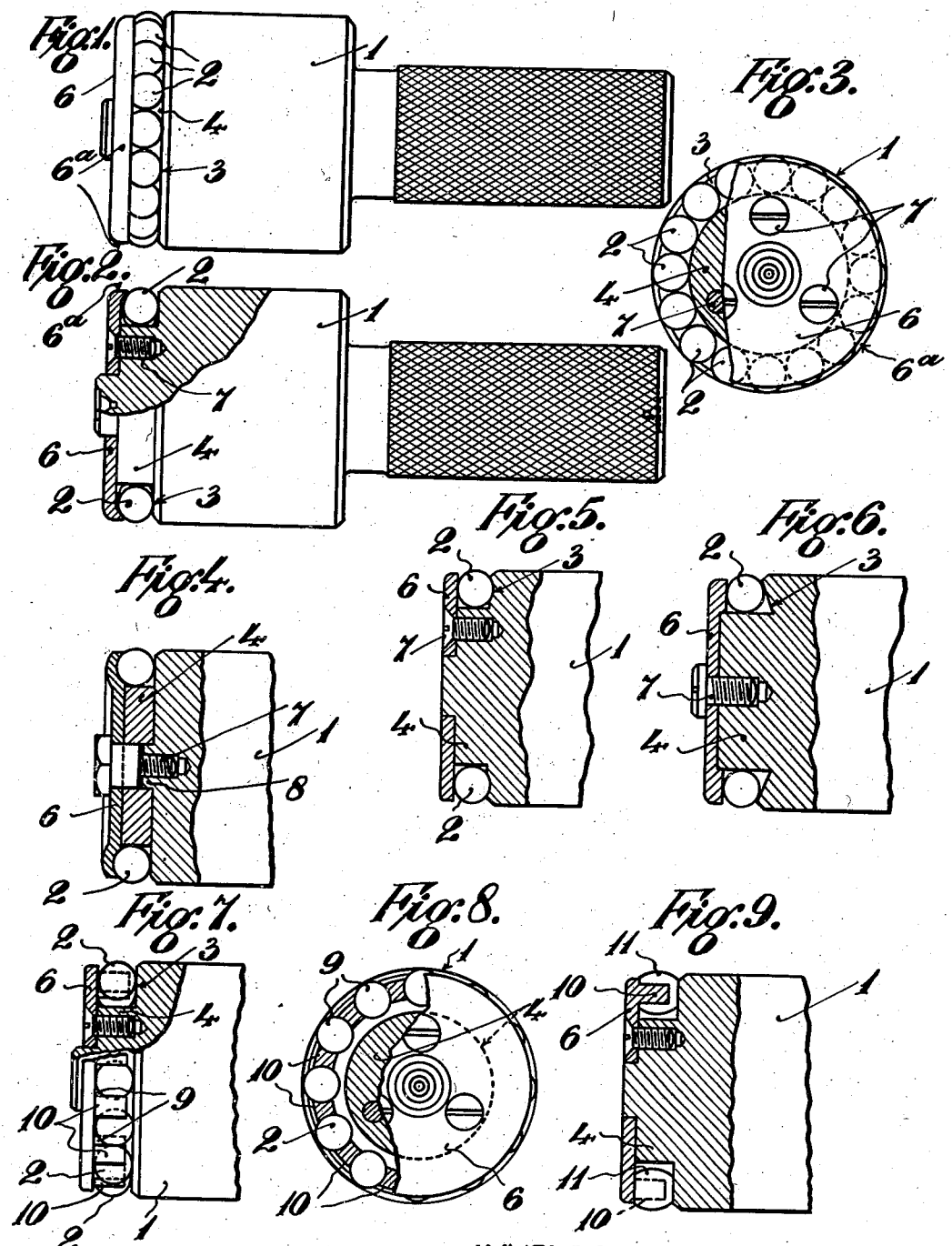

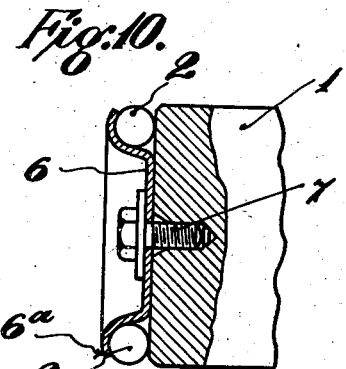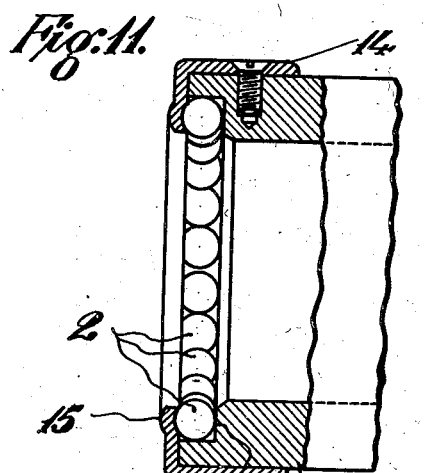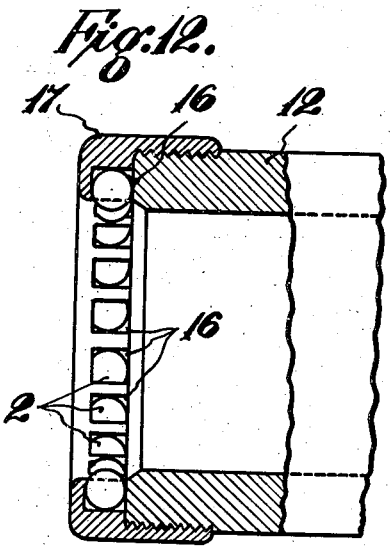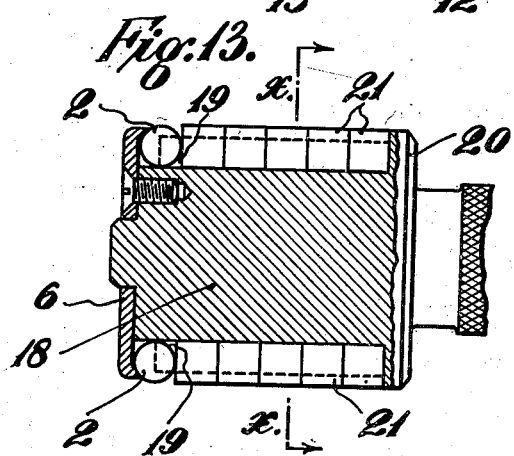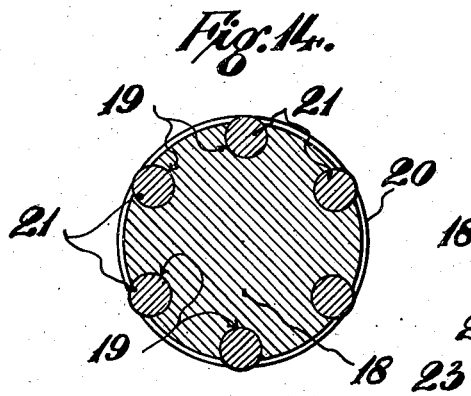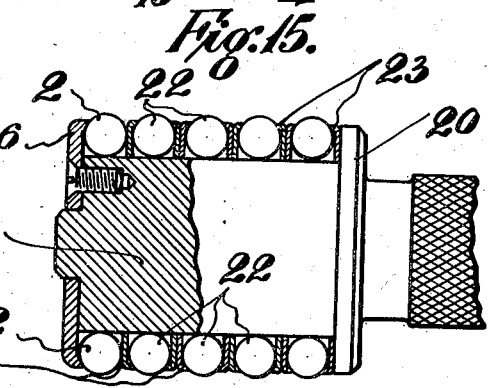

2,381,491

UNITED STATES PATENT OFFICE 2,381,491

MEANS FOR GUIDING GAUGES

John Thomas Emmerton, Birmingham, England, assignor, by mesne assignments, to British Timken Limited, Aston, Birmingham, England, a company of Great Britain Application March 30, 1942, Serial No. 436,790
In Great Britain August 4, 1941

12 Claims. (Cl. 33—178)

This invention relates more particularly to gauges for checking or measuring the internal or external dimensions of parts or articles, such gauges being of that kind consisting either of a plug or cylindrical member for inserting into a hole in the article, for checking or measuring the size of the hole; or of a ring or apertured part for fitting over a part to be measured or tested. The invention also relates, however, to mandrels and other parts which have to be engaged into a hole or aperture, or over an associated part or member.

With such plug or ring gauges difficulty is sometimes experienced in inserting the same into the hole to be checked, or over the part to which it is to be applied, unless the axis of the gauge is in proper alignment with the axis of the said hole or part, which difficulty is increased when the gauge and the hole or part are of a large diameter, and in some cases sticking or jamming of the gauge results. The same difficulty occurs, in some cases, with mandrels and other parts where they have to be engaged into a closely-fitting hole, or over a closely-fitting associated part.

It is the object of the present invention to avoid the above disadvantage, and to provide a gauge, mandrel or other part, with improved and self-contained means for enabling the same to be readily introduced into the hole or over the associated part, or part to be measured or tested, even although its axis and the axis of the said hole or part are initially out of alignment.

According to the invention, a gauge, mandrel or other part, is provided having at an end or side a lead or guide consisting of a plurality of balls or movable elements adapted, during the initial application of the said gauge, mandrel or part, to contact with the wall or surface of the hole with which the gauge, mandrel or part, is to be engaged, or of the member over which the same is to be passed, so that the said gauge, mandrel or part, is guided by the said balls or movable elements into the hole or over the member in question. In the case of a gauge, for example, the latter may carry a ring of balls, the balls being capable of contacting with a circle concentric with the gauge or gauge-aperture and of a diameter slightly less than, or equal to, that of the said gauge (in the case of a plug gauge) or slightly larger than, or equal to, that of the gauge-aperture (in the case of a ring gauge). The balls may be held in place by any suitable retaining means attached to the gauge. Thus, in the case of a plug-gauge the end of the gauge may be formed with an annular shoulder upon which the balls are arranged, the balls being held in place by a plate or retaining member attached to a central part of the plug.

Figure 1 of the accompanying drawings shows a side view of a plug-gauge provided with a lead or guide, consisting of a ring of balls, in accordance with this invention.

Figure 2 is a side view of the gauge, partly in section.

Figure 3 represents an end view of the gauge, partly in section.

Figures 4, 5 and 6 show gauges having alternative means for retaining the balls, which form the lead or guide, in place.

Figure 7 shows another arrangement in which the balls which form the lead or guide are each located within a separate recess.

Figure 8 is an end view, partly in section, of the gauge shown in Figure 7.

Figure 9 is a sectional view illustrating another arrangement in which rollers are used to form the lead or guide.

Figure 10 shows another modified form of plug gauge.

Figures 11 and 12 illustrate the application of the invention to a ring-gauge, showing two different constructions which may be employed.

Figure 13 is a part-sectional view of a plug-gauge having balls to form a lead or guide, and in which the gauge body is provided with rows of rollers.

Figure 14 represents a cross-section on the line x—x, Figure 13.

Figure 15 shows another form of plug-gauge, in which the body of the gauge comprises rings of balls threaded over a central part or spindle, balls being also provided to act as a lead or guide.

Referring to Figures 1 to 3, which show the invention applied to a plug-gauge 1, the latter is of the usual cylindrical form, but instead of being formed with a plain outer end it is provided at the said end with a ring of balls 2, the balls 2 being arranged so that they will contact with a circle concentric with the periphery of the gauge, but of a diameter slightly less than that of the said gauge. In order to hold the balls 2 in place so that they form a ring of a definite size, whilst being free to turn or rotate, the end-face of the gauge is formed with an annular shoulder 3 forming a race for the balls and surrounding an integral central boss 4 constituting a radial track for the balls. Fitted against the flat outer face of this base, over a central positioning spigot 5, is a circular ball-retaining plate 6, the said plate being secured by fixing screws 7 engaging tapped holes in the end face of the boss 4. The plate 6 then provides, with the stepped end of the gauge, an annular groove to receive the balls 2 which are free to travel over the the annular race or shoulder 3. An annular race is also formed by the inner face of the retaining plate 6, the edge 6ª of the latter being turned in, as shown, to retain the balls which project beyond the said edge of the retaining plate, so that they are thus partly exposed.

In use, during the application of the gauge, for checking or measuring the size of a hole in an article or part, the balls are first engaged within the hole, thus forming a lead or guide for the gauge, when, owing to the disposition of the balls and owing to the fact that they are free to turn or rotate, the gauge may be easily inserted into the hole, provided the latter is not too small, even if the said gauge, when first presented, is tilted so that its axis is out of line with the axis of the hole, the balls forming an efficient guide and enabling the gauge to be inserted without sticking or jamming.

The ball-retaining plate may be formed in any desired manner and it may be of any suitable shape. It may, for example, consist of a metal plate 6 shaped as shown in Figure 4. In this case a separate disc 4 is shown applied against the end of the gauge body 1 to space the plate 6 from the latter, both the plate 6 and the disc 4 being secured by a central screw 7, the end of the gauge having a central projection 8 engaging a hole in the disc in order correctly to position the latter. The balls 2 are arranged to run freely between the plate 6 and the end of the gauge 1, the balls acting as a lead for facilitating the engagement of the gauge within the aperture to be measured or checked, as in the preceding arrangement.

In the construction illustrated in Figure 5 a flat ball-retaining plate 6 is provided secured against an integral boss 4 on the end of the gauge body 1 by screws 7. A peripheral groove is thus formed for the balls 2, which engage between the flat plate 6 and an annular shoulder 3 around the boss 4 of the plug. This shoulder 3 is formed with a transversely-curved race for the balls, so that the latter are retained in place.

Figure 6 illustrates another modification in which balls 2, forming a lead or guide for the gauge, are located in a peripheral groove between an annular shoulder 3 on the gauge body and the flat surface of a plate 6 secured to a boss 4 on the end of the gauge by a central screw 7. In this arrangement the balls 2 are prevented from falling out of the groove by forming the shoulder 3 around the plug with an inclined ball-engaging face, as shown.

Instead of the balls which form the lead being free to travel around a peripheral groove, as in the above described constructions, each ball may be located within a separate recess or housing, such, for example, as in the manner shown in Figures 7 and 8 of the drawings. According to this construction the gauge body 1 is formed with a central boss 4 and has an annular shoulder 3 against which the balls 2 may engage, whilst the latter are fitted into peripherally-separated gaps or recesses 9 cut in a flange carried by the plate 6, leaving separating parts 10, shaped as shown in Figure 8, between the balls, so that the latter, whilst being free to turn, are held in their respective positions.

Figure 9 illustrates another arrangement, in which a plate 6, having a gapped or recessed flange, is attached to a boss 4 on the end of the gauge body 1, but in this case there is fitted within each gap or recess, between the separating parts 10, a barrel-shaped roller 11 instead of a ball. The rollers 11 form a lead or guide for facilitating the engagement of the gauge within the hole to be checked or measured in the same way as the balls in the preceding constructions.

In the construction shown in Figure 10 of the drawings, the end of the plug-gauge 1 is plain, instead of being stepped, and the balls 2, which form the lead or guide for the gauge, are retained against the end face of the plug 1 by a plate 6 of a circular dished formation, having a transversely-curved annular flange 6$^a$ which constitutes a race for the balls. The plate 6 may consist of a sheet metal pressing and may be attached by a central screw 7.

Figure 11 shows the application of the invention to a gauge 12 of the ring type, for checking or measuring the external dimensions of a part or article. The one end of the gauge is stepped to provide an annular shoulder or race 13 for receiving balls 2, and a flanged circular cap 14 is fitted over the end of the gauge with the flange 15 opposed to the said shoulder or race, so as to form, with the stepped portion, an annular groove opening into the hole in the gauge, the said flange 15 constituting a second race. The balls 2 are assembled before the cap 14 is secured, and after the attachment of the cap the flange of the latter holds the balls 2 in place, the balls, which are free to rotate, being arranged so that they will contact with a circle of a diameter slightly larger than, or if desired equal to, that of the hole in the gauge, and forming a lead or guide to facilitate the engagement of the gauge over the article to be checked. The cap may be machined, or formed as a pressing; or a cap of any other suitable form may be provided.

Figure 12 shows a ring-gauge 12 fitted with balls 2 to serve as a lead or guide, but separate pockets or recesses 16 are provided for the balls, these pockets being cut in the retaining member 17 which is screwed on to the end of the gauge. The balls 2 enable the gauge to be readily fitted over the article to be checked or measured, without sticking, even if the gauge is tilted so that its axis is out of alignment with the axis of the said article.

Any number of balls or rollers may be provided to form a lead or guide, and the arrangement may be such (in the case of either a plug or ring gauge) that the balls or rollers may be readily removed and renewed, if necessary.

Figure 13 and 14 show a plug-gauge in which the contacting or gauging portion is made up of a plurality of projecting rollers. Thus, referring to these figures, the gauge consists of a cylindrical body part 18 smaller than the hole to be measured and formed with a plurality of part-circular-sectioned passages 19 peripherally spaced and extending from one end of the gauge to the other, parallel to the gauge axis, the passages 19, which are closed at their inner ends, such as by a flange 20, cutting through the peripheral surface of the plug to leave a plurality of longitudinal slots. A plurality of rollers 21 are inserted endwise into each passage, so that their peripheries project through the slots, the projecting portions of the rollers 21 contacting with the wall of the hole being checked or measured when the gauge is being used. Balls 2 are fitted into the outer ends of the passages 19, so as to project out from the said ends, these balls 2 being arranged to constitute a guide or lead for the gauge to guide it into the hole, as in the plug-gauges previously described. The balls 2 are held within the passages by a retaining plate 6 secured by screws.

Another form of plug-gauge is shown in Figure 15. The gauge is formed, in this case, by a number of rings of balls 22, the balls of each ring being housed in a circular cage 23, and the cages, with the balls, being threaded over a cylindrical spindle or shank 18 up to a flange 20 which forms a stop. The whole of the measuring surface of the gauge is thus formed by the balls 22 which are arranged to contact with the wall of the hole to be measured, if the diameter of the latter is correct. The balls 2 at the extreme outer end of the plug thus formed, form a lead, as in the previous arrangements, for guiding the gauge into the hole, and these balls may be of a slightly-smaller diameter. The cages 23 and the balls 22 and 2, may be held on the spindle or shank 18 by any suitable means, such as the retaining plate 6.

A ring-gauge may be constructed in substantially the same way, a plurality of ring-shaped cages carrying balls being fitted into the interior of the gauge body, so that the measuring or checking part is formed by the balls, the balls in the outermost cage forming a lead or guide; or rollers may be inserted into passages formed in the gauge body parallel to its axis, so that the rollers project from the inside wall of the gauge body and contact with the part to be measured, balls being fitted against the ends of the outermost rollers to form a guide.

Although the invention has been particularly described in connection with a cylindrical plug-gauge and with a ring-gauge, it may be applied, if desired, to a plug-gauge of a non-cylindrical form, or to a gauge having a non-circular aperture, the balls being arranged to conform with the gauge contour or gauge aperture.

The application of the invention to mandrels and other parts, where the mandrel or part has to be inserted into a hole or over an associated part, differs in no essential respect from its application to gauges, as above described, the end of the mandrel or part carrying a plurality or rings of balls or movable elements to form a guide or lead.

I claim:

1. A gauge comprising a body part, an annular shoulder around an end of the body part forming a race, a plurality of freely-movable balls engaging the said shoulder, and retaining means for maintaining the balls in engagement with the shoulder, the said balls forming a lead for guiding the body part relative to a part to be tested.

2. A gauge comprising a body part, a plurality of balls, and a retaining part on the gauge adapted to hold the balls in engagement with an end of the body part and form a race for the balls, so that the latter constitute a lead for guiding the body part relative to a part to be tested.

3. A gauge comprising a body part, movable elements on the said body part forming the measuring portion of the gauge and a ring of freely movable balls at one end of the body part forming a lead for guiding the gauge relatively to a part to be tested.

4. A plug-gauge comprising a cylindrical body part, an annular shoulder around one end of the body part, freely-movable balls engaging the annular shoulder, a retaining member, and means for securing the retaining member to the end of the body part of the gauge, so that the said member extends over the balls and retains them in engagement with the annular shoulder.

5. A plug gauge comprising a cylindrical body part, an annular shoulder around one end of the body part, freely movable balls engaging the annular shoulder, a retaining member for retaining the movable balls in engagement with the shoulder, the said movable balls being adapted to contact with a circle of a diameter slightly less than that of the gauge body.

6. A plug-gauge comprising a body part, balls surrounding the body part and forming the measuring part of the gauge, and a ring of freely movable balls at one end of the body part forming a lead for guiding the gauge into the aperture to be tested.

7. A plug-gauge comprising a cylindrical body part, a stop at one end of the body part, cages threaded over the gauge body up to the stop, balls within the cages forming the measuring portion of the gauge, balls at one end of the gauge body forming a lead for guiding the gauge into the aperture to be tested, the latter balls being adapted to contact with a circle of a diameter slightly smaller than that of the aperture to be tested, and means for retaining the whole of the balls on the gauge body.

8. A gauge having a cylindrical gauging surface and a plurality of movable balls disposed adjacent to the leading end of said gauging surface without projecting beyond the diameter thereof, so as to constitute a lead for guiding the cylindrical gauging surface relative to the part to be gauged.

9. A gauge having a body part formed with a cylindrical gauging surface, an annular shouldered portion around the said body part, and a plurality of movable balls engaging the shouldered portion and disposed so that they do not project beyond the gauging surface, the said movable balls constituting a lead for guiding the gauge.

10. A gauge comprising means for gauging a workpiece to be tested, a ring of freely movable balls mounted adjacent to the outer end of said means for guiding said means relative to the workpiece, the contacting diameter of said ring of balls being different than the diameter of said gauging means, and an annular member detachably secured to said gauge for retaining said ring of balls to the outer end of said gauging means, said annular member contacting the outer portion of said ring of balls but leaving the contacting surface of the ring of balls exposed for contacting the workpiece to be tested.

11. A plug gauge comprising means for gauging the interior diameter of an annular opening, a ring of freely movable balls mounted adjacent to one end of said means for guiding said means into the annular opening, the outer diameter of said ring of balls being less than the outer diameter of said gauging means, and an annular cover having a diameter less than the outer diameter of said ball ring detachably secured to said means to retain said balls thereto.

12. A gauge comprising means for gauging the exterior diameter of an annular member to be tested, a ring of freely movable balls mounted adjacent one end of said means for guiding said means relative to the member to be tested, the inner diameter of said ring of balls being greater than the diameter of said gauging means, and an annular ring member having an inner diameter greater than the inner diameter of said ball ring detachably secured to said gauge to retain said balls thereto.

JOHN THOMAS EMMERTON.